(12) United States Patent
Gupta et al.

(10) Patent No.: US 8,183,181 B1
(45) Date of Patent: May 22, 2012

(54) OIL FIELD TREATMENT FLUIDS COMPRISING ZWITTERIONIC BETAINE-GROUP-CONTAINING POLYMERS

(75) Inventors: D. V. Satyanarayana Gupta, The Woodlands, TX (US); Madhukar Chetty, Houston, TX (US); Paul Scott Carman, Spring, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 12/950,756

(22) Filed: Nov. 19, 2010

(51) Int. Cl.
*C09K 8/04* (2006.01)
*C09K 8/60* (2006.01)
*C09K 8/588* (2006.01)
*E21B 43/25* (2006.01)
*E21B 21/00* (2006.01)

(52) U.S. Cl. .............. 507/120; 166/278; 166/308.1; 175/65; 507/129; 507/222; 507/225; 507/240

(58) Field of Classification Search ............ 507/120, 507/129, 222, 225, 240; 166/278, 308.1; 175/65
See application file for complete search history.

(56) References Cited

U.S. PATENT DOCUMENTS

| | | | |
|---|---|---|---|
| 4,585,846 A | 4/1986 | Schulz et al. | |
| 4,607,076 A | 8/1986 | Schulz et al. | |
| 4,708,998 A | 11/1987 | Schulz | |
| 4,788,247 A | 11/1988 | Schulz | |
| 4,822,847 A | 4/1989 | Schulz et al. | |
| 5,153,289 A | 10/1992 | Schulz | |
| 5,362,408 A | 11/1994 | Pakulski et al. | |
| 5,600,044 A * | 2/1997 | Colle et al. ........... | 585/15 |
| 6,046,140 A | 4/2000 | Woo et al. | |
| 6,284,854 B1 | 9/2001 | Bowers et al. | |
| 6,410,671 B1 | 6/2002 | Argillier et al. | |
| 6,509,300 B1 | 1/2003 | Gupta | |
| 6,590,051 B1 | 7/2003 | Carter et al. | |
| 6,632,779 B1 | 10/2003 | Vollmer et al. | |
| 7,056,868 B2 | 6/2006 | Benton et al. | |
| 7,148,185 B2 | 12/2006 | Fu et al. | |
| 7,385,019 B2 | 6/2008 | Maroy et al. | |
| 7,426,961 B2 | 9/2008 | Stephenson et al. | |
| 2008/0045420 A1 | 2/2008 | Karagianni et al. | |
| 2008/0121395 A1 | 5/2008 | Reddy et al. | |
| 2009/0197791 A1 | 8/2009 | Balastre et al. | |
| 2010/0197530 A1 | 8/2010 | Gupta | |
| 2011/0257333 A1 | 10/2011 | Adam et al. | |

FOREIGN PATENT DOCUMENTS

| | | |
|---|---|---|
| FR | 2 914 647 A1 | 10/2008 |
| WO | WO2005059860 A2 | 6/2005 |
| WO | WO2007068744 A1 | 6/2007 |

OTHER PUBLICATIONS

Rhodia, Rhodacal A-246/L, Material Safety Data Sheets, prepared Jun. 17, 2010.
Rhodacal A-2461L, Product Data Sheet N000727, dated Nov. 2007.
Rhodapex CD-12811, Product Data Sheet N000547, dated Sep. 2007.
Bulat, D. et al., A Faster Cleanup, Produced-Water-Compatible Fracturing Fluid: Fluid Designs and Field Case Studies, SPE 112435, Society of Petroleum Engineers, Copyright 2008.
Leiming, L., Well Treatment Fluids Prepared with Oilfield Produced Water, SPE 124212, Society of Petroleum Engineers, Copyright 2009.
Huang, F., et al., Feasibility of Using Produced Water for Crosslinked Gel-Based Hydraulic Fracturing, SPE 94320, Society of Petroleum Engineers, Copyright 2005.
Wikipedia, Emulsion polymerization, http://en.wikipedia.org/wiki/Emulsion_polymerization.
Wikipedia, Ethoxylation, http://en.wikipedia.org/wiki/Polyethoxylated.
Wikipedia, Iron (III) chloride, http://en.wikipedia.org/wiki/Ferric_chloride.
"Brine Definition", Sep. 27, 2008, p. 1 Publisher: Wikipedia, http://en.wikipedia.org/wiki/Brine.
"Brine Lake Definition", Sep. 27, 2008, p. 1 Publisher: Wikipedia, http://en.wikipedia.org/wiki/Brine_lake.
Office Action issued Sep. 14, 2010 in U.S. Appl. No. 12/365,673.
Darlington, et al., "Viscous Heavy Brine Completion Fluids", Mar. 24, 1982, pp. 257 to 263, No. 10671, Publisher: Society of Petroleum Engineers.
P.H. Javora, et al., "Viscosification of Oilfield Brines: Guidlines for the Prevention of Unexpected Formation Damage", Feb. 23, 2000, pp. 118, No. 58728, Publisher: Society of Petroleum Engineers of AIME.
J. Bagal, et al., "Engineered Application of a Weighted Fracturing Fluid in Deep Water", Feb. 15, 2006, pp. 116, No. 98348, Publisher: Society of Petroleum Engineers.
International Search Report & Written Opinion dated Feb. 15, 2012 issued in PCT/US2011/060748.
European Extended Search Report dated Feb. 15, 2012 issued in EP Application No. 11189749.2.

* cited by examiner

*Primary Examiner* — Timothy J. Kugel (74) *Attorney, Agent, or Firm* — Parsons Behle & Latimer (57) ABSTRACT

The present disclosure is directed to a method comprising: mixing (i) a zwitterionic polymer prepared by inverse emulsion polymerization of at least one monomer $A_b$ comprising a betaine group and optionally one or more nonionic monomers $B_a$, (ii) a surfactant and (iii) produced water to form a well servicing fluid. The resulting well servicing fluid is introduced into a hydrocarbon well.

32 Claims, 5 Drawing Sheets

OIL FIELD TREATMENT FLUIDS COMPRISING ZWITTERIONIC BETAINE-GROUP-CONTAINING POLYMERS

BACKGROUND

The present disclosure relates generally to a well bore servicing fluid, and more particularly to the viscosification of a well bore servicing fluid using polymers comprising betaine units.

In the past, well drilling and development operations have employed large amounts of fresh water. In some areas, obtaining fresh water for these operations has become more expensive and difficult due to water shortages and government regulation. On the other hand, vast amount of produced water can be generated from hydrocarbon wells. Generally, this produced water must be disposed of at a significant cost. Given the volume of fresh water required for well operations, the ability to reclaim and use produced water as a well servicing fluid could alleviate the impact of well operations on fresh water shortages, reduce environmental concerns of contaminating fresh water reserves, and potentially lower the cost of well servicing operations.

However, produced water often has high concentrations of total dissolved solids ("TDS"), including high salinity and hardness content. Many conventional viscosifying polymers, including polyacrylamide based slick water fracturing polymers, do not function well in such high salinity waters, especially in the presence of metals, such as iron, which are often present in produced water. Also, many surfactants commonly used in well servicing fluids have reduced solubility in produced water due to the high TDS content. Reduced solubility of the surfactants can increase mixing times and/or reduce the viscosifying effect of the viscosifying polymers in the produced water. It therefore would be an advancement in the art to discover a novel viscosifying system that worked well in produced water, especially in produced water having relatively high TDS content.

The use of polymers comprising betaine units for viscosifying hydrocarbon well fluids was disclosed by D.V. Satyanarayana Gupta et al., in copending U.S. Patent Application Publication No. 2010/0197530 ("the '530 Application"), published on Aug. 5, 2010, the disclosure of which is hereby incorporated by reference in its entirety. The application discloses a servicing fluid for use in natural gas or oil field wells. The well servicing fluid includes an aqueous brine media and a zwitterionic polymer. The zwitterionic polymer is prepared by polymerization of at least one monomer, $A_b$, comprising a betaine group and optionally one or more nonionic monomers, $B_a$. The brines used in the examples of the '530 application were stock completion brines, which are high purity brines and mixtures without significant amounts of contaminants such as iron, barium, strontium, sulfates and other contaminants that are often contained in produced water.

The zwitterionic polymers of the '530 Application may be mixed with brines using a batch mixing process. For examples, the brines can be mixed at high shear with a surfactant, such as ammonium salts of polyarylphenyl ether sulfate in a batch process for about 15 minutes until a desired viscosity of the fluid is reached.

It is well known in the art that well fluid can be mixed "on-the-fly" as it is pumped downhole. On-the-fly processes generally involve mixing components, such as the viscosifying polymer, for a relatively short period of time compared to batch mixing processes, and then pumping the well fluid downhole. In order to mix fluids on the fly, surfactants can be used to allow the viscosifying polymer to mix rapidly and thereby quickly allow the well servicing fluid to reach a suitable viscosity. The ability to mix viscosifying polymers on-the-fly can have certain benefits, including saving time and/or allowing for reduced mixing equipment size and cost relative to batch mixing processes. The ability to employ viscosifying polymers in either batch or on-the-fly mixing processes also increases process flexibility.

Accordingly, there exists a need for improved viscosification agents for use as well bore-servicing fluids that exhibit one or more of the following properties: reduced mixing time, the ability to allow on-the-fly mixing in high salinity water or produced water, good viscosifying power in produced waters, good rheological stability at increased temperatures in produced waters, good stability at a relatively high ionic strength and/or good stability in a relatively saline medium, such as produced water with high total dissolved solids; good thickening power for media comprising a relatively high ionic strength, such as saline media, including highly saline media, and/or a thickening power at low contents of polymer.

SUMMARY

An embodiment of the present disclosure is directed to a method comprising: mixing (i) a zwitterionic polymer prepared by inverse emulsion polymerization of at least one monomer $A_b$ comprising a betaine group and optionally one or more nonionic monomers $B_a$, (ii) a surfactant and (iii) produced water to form a well servicing fluid. The resulting well servicing fluid is introduced into a hydrocarbon well.

Another embodiment of the present disclosure is directed to a method of servicing a hydrocarbon well. The method comprises introducing into a hydrocarbon well a fluid comprising (i) a zwitterionic polymer prepared by inverse emulsion polymerization of at least one monomer $A_b$ comprising a betaine group and optionally one or more nonionic monomers $B_a$, (ii) a surfactant chosen from ammonium $C_4$-$C_{12}$ alkyl ether sulfates, ammonium $C_4$-$C_{12}$ alkyl ether sulfonates and ammonium $C_4$-$C_{12}$ alkyl ether phosphates; and (iii) an aqueous based saline solution.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the invention as defined by the appended claims.

DETAILED DESCRIPTION

The present disclosure is directed to a servicing fluid for use in a natural gas or oil field well bore. In an embodiment, the servicing fluid includes a zwitterionic polymer, a surfactant and produced water. In another embodiment, the servicing fluid includes a zwitterionic polymer; a surfactant chosen from ammonium $C_4$-$C_{12}$ alkyl ether sulfates, ammonium $C_4$-$C_{12}$ alkyl ether sulfonates and ammonium $C_4$-$C_{12}$ alkyl ether phosphates; and an aqueous based saline solution. The zwitterionic polymer is prepared by polymerization of at least one monomer, $A_b$, comprising a betaine group and optionally one or more nonionic monomers, $B_a$.

According to the present disclosure, the monomer, $A_b$, can be chosen from at least one of the following monomers:

A) substituted or unsubstituted alkylsulphonates or alkylphosphonates of dialkylammonioalkyl acrylates, dialkylammonioalkyl methacrylates, dialkylammonioalkyl acrylamides, dialkylammonioalkyl methacrylamides, dialkylammonioalkoxyalkyl acrylates, dialkylammonioalkoxyalkyl methacrylates, dialkylammonioalkoxyalkyl acrylamides, and dialkylammonioalkoxyalkyl methacrylamides, such as:

1) sulphopropyldimethylammonioethyl methacrylate, sold by Raschig under the name SPE (Formula 1):

(1)

2) sulphoethyldimethylammonioethyl methacrylate (Formula 2) and sulphobutyldimethylammonioethyl methacrylate (Formula 3):

(2)

(3)

the synthesis of which is described in the paper "Sulfobetaine zwitterionomers based on n-butyl acrylate and 2-ethoxyethyl acrylate: monomer synthesis and copolymerization behavior", Journal of Polymer Science, 40, 511-523 (2002), the disclosure of which is incorporated herein by reference in its entirety.

3) sulphohydroxypropyldimethylammonio ethyl methacrylate (SHPE) (Formula 4):

(4)

4) sulphopropyldimethylammoniopropylacrylamide (Formula 5):

(5)

the synthesis of which is described in the paper "Synthesis and solubility of the poly(sulfobetaine)s and the corresponding cationic polymers: 1. Synthesis and characterization of sulfobetaines and the corresponding cationic monomers by nuclear magnetic resonance spectra", Wen-Fu Lee and Chan-Chang Tsai, Polymer, 35 (10), 2210-2217 (1994), the disclosure of which is incorporated herein by reference in its entirety.

5) sulphopropyldimethylammoniopropylmethacrylamide, sold by Raschig under the name SPP (Formula 6):

(6)

6) sulphopropyldimethylammonioethyl acrylate, sold by Raschig under the name SPDA (Formula 7):

(7)

7) sulphohydroxypropyldimethylammoniopropylmethacrylamide ("SHPP") (Formula 8)

(8)

(SHPP)

8) sulphopropyldiethylammonioethoxyethyl methacrylate (Formula 9)

(9)

the synthesis of which is described in the paper
"Poly(sulphopropylbetaines): 1. Synthesis and characterization", V. M. Monroy Soto and J. C. Galin, Polymer, 1984, Vol. 25, 121-128, the disclosure of which is incorporated herein by reference in its entirety.

9) sulphohydroxypropyldiethylammonioethyl methacrylate (Formula 10)

(10)

B) substituted or unsubstituted heterocyclic betaine monomers, such as:

1) sulphobetaines derived from piperazine, examples which include compounds of Formulae 11, 12 and 13, (11)

(12)

(13)

the synthesis of which is described in the paper "Hydrophobically Modified Zwitterionic Polymers: Synthesis, Bulk Properties, and Miscibility with Inorganic Salts", P. Koberle and A. Laschewsky, Macromolecules, 27, 2165-2173 (1994), the disclosure of which is incorporated herein by reference in its entirety.

2) sulphobetaines derived from vinyl substituted pyridines, such as 2-vinylpyridine and 4-vinylpyridine, examples of which include:

a) 2-vinyl-1-(3-sulphopropyl)pyridinium betaine (2SPV or "SPV") (Formula 14), sold by Raschig under the name SPV:

(14)

b) 4-vinyl-1-(3-sulphopropyl)pyridinium betaine ("4SPV") (Formula 15), (15)

the synthesis of which is disclosed in the paper "Evidence of ionic aggregates in some ampholytic polymers by transmission electron microscopy", V. M. Castaño and A. E. González, J. Cardoso, O. Manero and V. M. Monroy, J. Mater. Res., 5 (3), 654-657 (1990), the disclosure of which is incorporated herein by reference in its entirety.

3) sulphobetaines derived from imidazoles, such as:

a) 1-vinyl-3-(3-sulphopropyl)imidazolium betaine (Formula 16)

(16)

the synthesis of which is described in the paper "Aqueous solution properties of a poly(vinyl imidazolium sulphobetaine)", J. C. Salamone, W. Volkson, A.P. Oison, S.C. Israel, Polymer, 19, 1157-1162 (1978), the disclosure of which is incorporated herein by reference in its entirety.

C) substituted or unsubstituted alkylsulphonates or alkylphosphonates of dialkylammonioalkylallylics, such as:

1) sulphopropylmethyldiallylammonium betaine (17):

(17)

the synthesis of which is described in the paper "New poly(carbobetaine)s made from zwitterionic diallylammonium monomers", Favresse, Philippe; Laschewsky, Andre, Macromolecular Chemistry and Physics, 200(4), 887-895 (1999), the disclosure of which is incorporated herein by reference in its entirety.

D) substituted or unsubstituted alkylsulphonates or alkylphosphonates of dialkylammonioalkylstyrenes, such as the compounds of formulae 18 and 19:

(18)

(19)

the synthesis of which is described in the paper "Hydrophobically Modified Zwitterionic Polymers: Synthesis, Bulk Properties, and Miscibility with Inorganic Salts", P. Koberle and A. Laschewsky, Macromolecules, 27, 2165-2173 (1994), the disclosure of which is incorporated herein by reference in its entirety.

E) substituted or unsubstituted betaines resulting from ethylenically unsaturated anhydrides and dienes, such as the compounds of Formulae 20 and 21:

(20)

(21)

the synthesis of which is described in the paper "Hydrophobically Modified Zwitterionic Polymers: Synthesis, Bulk Properties, and Miscibility with Inorganic Salts", P. Koberle and A. Laschewsky, Macromolecules, 27, 2165-2173 (1994), the disclosure of which is incorporated herein by reference in its entirety.

F) substituted or unsubstituted phosphobetaines, such as the compounds of formula 22 ("MPC") and formula 23 ("VPC"):

(22)

(23)

The synthesis of MPC and of VPC is described in EP 810 239 B1 (Biocompatibles, Alister et al.), the disclosure of which is incorporated herein by reference in its entirety.

In embodiments where the monomers $A_b$ described above are substituted, the substituents can be chosen from any suitable groups that will not be significantly detrimental to a desired function of these compounds, such as the ability to provide viscosification of a well bore servicing fluid. The substituents can be bonded to, for example, the cyclic moieties and/or linear carbon chain moieties of the compounds. Examples of suitable substituents can include hydroxyl groups, such as in formulae 4, 8 and 10 above, as well as $C_1$ to $C_6$ alkyl groups.

In an embodiment, the betaines can be monomers of formula 24:

(24)

or of formula 25:

(25)

in which:

R¹ is hydrogen or methyl,

R² and R³, which are identical or different, are hydrogen or alkyls having from 1 to 6 carbon atoms, $Y_1$ is —O— or $NR_2$, $Z^-$ is $SO_3^-$, m is 2 or 3, and n is 1-6.

In an embodiment, the monomer $A_b$ can be chosen from sulphopropyldimethylammonioethyl methacrylate (SPE), sulphoethyldimethylammonioethyl methacrylate, sulphobutyldimethylammonioethyl methacrylate, sulphohydroxypropyldimethylammonioethyl methacrylate (SHPE), sulphopropyldimethylammoniopropylacrylamide, sulphopropyldimethylammoniopropylmethacrylamide (SPP), sulphohydroxypropyldimethylammoniopropylmethacrylamide (SHPP), sulphopropyldimethylammonioethyl acrylate (SPDA), sulphopropyldiethylammonioethoxyethyl methacrylate, 2-vinyl-1-(3-sulphopropyl)pyridinium betaine, 4-vinyl-1-(3-sulphopropyl)pyridinium betaine, 1-vinyl-3-(3-sulphopropyl)imidazolium betaine, sulphopropylmethyldiallylammonium betaine.

In another exemplary embodiment, monomer $A_b$ corresponds to one of the following formulae:

(1)

(4)

(8)

(7)

The hydrophilic nonionic monomer $B_a$ can be chosen to be one or more of: hydroxyethyl acrylate, hydroxyethyl methacrylate, hydroxypropyl acrylate and hydroxypropyl methacrylate, acrylamide (AM), methacrylamide, N-methylolacrylamide, dimethylacrylamide, dimethylmethacrylamide, polyethylene oxide, polypropylene oxide, polyethylene/polypropylene oxide copolymers (which can be any suitable type of copolymer, such as block or random copolymers), α-methacrylates, vinyl alcohol or vinylpyrrolidone.

In an embodiment, the hydrophilic nonionic monomer $B_a$ is acrylamide (AM) and/or monomer $A_b$ includes one or both of sulphopropyldimethylammonioethyl methacrylate (SPE) and sulphopropyldimethylammoniopropylmethacrylamide (SPP). In an embodiment, the hydrophilic nonionic monomer $B_a$ is acrylamide (AM) and the monomer $A_b$ is SPP.

The polymers are thus prepared by an inverse polymerization process which comprises the following stages: a1) preparation of the inverse emulsion, and a2) polymerization. In an embodiment, stage a1) is carried out by emulsification of a mixture comprising the aqueous phase comprising the monomers, the external phase and at least one emulsifying agent. The polymerization is carried out by bringing together the monomers $A_b$ and optionally the monomers $B_a$ with an initiator compound that can generate free radicals.

The temperature employed for the polymerization can be any suitable temperature. For example, the temperature can range from about ambient temperature to about 75° C., depending on the initiating system chosen.

Any suitable concentration of monomers can be employed in the polymerization process. In an embodiment, the molar ratio of the monomers $A_b$ to the monomers $B_a$ ranges from about 4:96 to about 40:60, such as from about 7:93 to about 30:70.

As the external phase, any suitable inert hydrophobic liquid can be employed. Examples of suitable hydrophobic liquids can include aliphatic and aromatic hydrocarbons and halocarbons, such as toluene, xylene, o-dichlorobenzene, perchloroethylene, hexane, heptane, kerosene, a mineral oil and Isopar M (a substance of isoparaffin type of high purity sold by Exxon Corporation). Likewise, use may be made of any suitable water-in-oil emulsifying agent, such as hexadecyl sodium phthalate, sorbitan monooleate, sorbitan monostearate, mono- and diglycerides, polyethoxylated sorbitol hexaoleate, octyl sodium phthalate or stearyl sodium phthalate. In an embodiment, the emulsifying agent is sorbitan monooleate. Example concentrations of the emulsifying agent can range from about 0.5% to about 10%, such as from about 1% to about 5%, by weight of the emulsion.

The ratio of the aqueous phase to the external phase can vary within wide limits. For example, the water-in-oil emulsion can comprise from about 20% to about 80% of aqueous phase and thus from about 80% to about 20% of oil phase, these percentages being based on the total weight of the water-in-oil emulsion. In an embodiment, a ratio of the aqueous phase to the oil phase is about 70% to about 75% aqueous phase to about 30% to about 25% oil phase, where percentages are based on the total weight of the water-in-oil emulsion.

As discussed above, the polymerization is initiated by means of a chemical initiator comprising free radicals. This initiator can be dissolved either in the oil phase or in the aqueous phase, according to its solubility characteristics. Examples of water-soluble initiators can include 4,4'-azobis [4-cyanovaleric acid] (abbreviated to ACVA), potassium persulphate ($K_2S_2O_8$) and t-butyl hydroperoxide. Use may also be made of water-soluble initiators of redox type, such as bromate/bisulphite or metabisulphite (for example, $KBrO_3$/ $NaHSO_3$ or $KBrO_3/NaS_2O_5$) or persulphate/bisulphite initiators. Examples of oil-soluble initiators include azobisisobutyronitrile (AIBN) and 2,2'-azobis(2,4-dimethylvaleronitrile) (ADVN).

The proportion of chemical initiator used depends on several factors. For instance, if it is necessary to maintain a desired reaction rate, the proportion of initiator can be increased as the reaction temperature falls. By adjusting the reaction temperature and the proportion of initiator, it may be possible to carry out the polymerization in a reasonable time and with a reasonable conversion of monomer to polymer, retaining the advantages of a polymerization at low temperatures.

The water-soluble zwitterionic polymers of the present invention can be used as viscosifying agents for aqueous solutions over a wide range of salinity and of temperature and as agent for modifying surfaces of particles in aqueous suspensions. For these uses/applications, the polymer can be provided in any practical form. For example, the polymer can be provided in a dry solid form or in a vectorized form, such as in a solution, an emulsion or a suspension. In an embodiment, the polymer is provided in the form of an aqueous solution. In an example, the aqueous solution can comprise from about 5 to about 50% by weight, such as from about 10 to about 30% by weight, of the polymer.

The present disclosure also relates to compositions comprising the polymer. The polymer can help to increase the viscosity of the compositions. The polymer can be in the form of an aqueous composition comprising the inverse emulsion with the aqueous phase comprising the polymer dispersed in the form of droplets in a hydrophobic external phase and other ingredients chosen from a surfactant, an organic salt, an inorganic salt, a detergent and a thickener.

The aqueous composition can additionally comprise ionic entities, such as inorganic salts or organic salts, such as acid salts, it being possible for the salts to exhibit a surface-active or non-surface-active nature. The composition can be a "saline" composition. In an embodiment, the polymer can make it possible to increase the viscosity of compositions comprising ions, such as saline compositions, and in particular, of compositions of relatively high ionic strength. For instance, the polymer can make it possible to increase the viscosity of compositions comprising relatively large amounts of salts, such as compositions based on seawater or on brines, including produced water.

The ionic strength of the composition can range from low to high, depending on the application. It has been found that the polymer can be effective as thickening agent at a zero or low ionic strength and that it can, surprisingly, remain effective at a high ionic strength. The ionic strength can, for example, be at least about 0.7 mol/l or at least about 1 mol/l, or even greater than 2 mol/l, after saturation of the salt or mixture of salts. In an embodiment, the composition can comprise at least 25 g/l of a salt (11 pounds per gallon density), such as, for example, about 35 g/l of a salt or more.

Any suitable salts can be employed in the compositions of the present application. Suitable salts include monovalent, divalent and polyvalent salts. In an embodiment, the salts can include a cation selected from alkali metal, alkaline earth metal, ammonium, manganese, and zinc cations, and an anion selected from halides, oxides, carbonates, nitrates, sulfates, acetates and formate anions. For example, the salt can be potassium chloride, sodium chloride, sodium bromide, calcium chloride, calcium bromide, zinc bromide, zinc formate, zinc oxide and mixtures of these salts.

In an embodiment, the composition can be formed of seawater or a brine comprising the polymer. In an embodiment, the composition is a brine comprising divalent ions, such as those ions formed from the disassociation of alkaline earth metal salts, such as salts of calcium or magnesium, including $CaCl_2$, $CaBr_2$, $MgCl_2$ or $MgBr_2$; or other divalent ion forming salts, such as salts of zinc (e.g., $ZnCl_2$ or $ZnBr_2$). The concentration of the divalent ions in the brine can vary. In an example, the brine can comprise divalent salts in an amount greater than about 25% by weight of the total salts in the brine.

In an embodiment, the composition can comprise produced water. The produced water can have a relatively high total dissolved solids ("TDS") content. Examples of TDS content can range from about 50,000 mg/L up to saturation, such as about 100,000 mg/L to about 300,000 mg/L, based on the total volume of the composition.

The elements contained in the produced water can vary significantly depending on the source of the water. In an embodiment, the produced water can comprise at least one of calcium, potassium, iron, magnesium, strontium, sodium, sulfate and chloride. Examples of suitable dissolved calcium concentrations can range from about 5000 mg/L to saturation, such as about 10,000 or 15,000 mg/L to about 50,000 mg/L. Examples of suitable dissolved potassium concentrations can range from about 1000 mg/L to saturation, such as about 2000 or 3000 mg/L to about 10,000 mg/L. Examples of suitable dissolved iron concentrations can range from about 2 mg/L to saturation, such as about 5 or 10 mg/L to about 100 mg/L. Examples of suitable dissolved magnesium concentrations can range from about 5 mg/L to saturation, such as about 100 or 1000 mg/L to about 2500 mg/L. Examples of suitable dissolved strontium concentrations can range from about 5 mg/L to saturation, such as about 100 or 1000 mg/L to about 2500 mg/L. Examples of suitable dissolved sodium concentrations can range from about 10,000 mg/L to saturation, such as about 25,000 or 50,000 mg/L to about 100,000 mg/L. Examples of suitable dissolved sulfate concentrations can range from about 100 mg/L to about 50,000 mg/L, or up to saturation. Examples of suitable dissolved chloride concentrations can range from about 10,000 mg/L to saturation, such as about 50,000 or 100,000 mg/L to about 300,000 mg/L.

In addition to those listed above, produced water can include a variety of other species. Examples of such species include barium, boron, copper, manganese, molybdenum, phosphorus, silica, zinc, aluminum, carbonate, and bicarbonate.

The well servicing fluid composition can comprise any suitable amount of produced water. In an embodiment, the produced water can be 50% by weight or more of the well servicing fluid. For example, the produced water can range from about 75% to about 99.9% by weight of the composition.

In an embodiment, the well servicing fluid comprises at least one surfactant. Any suitable surfactant that is soluble in the brine or produced water can be employed. Examples of surfactants include ammonium organosulfates, such as ammonium $C_4$-$C_{12}$ alkyl ether sulfates; ammonium organosulfonates, such as ammonium $C_4$-$C_{12}$ alkyl ether sulfonates; and ammonium organophosphates, such as ammonium $C_4$-$C_{12}$ alkyl ether phosphates. In an embodiment, the surfactant is an ammonium $C_8$-$C_{10}$ alkyl ether sulfate. One example of a suitable ammonium $C_8$-$C_{10}$ alkyl ether sulfate is RHODAPEX® CD128/I, available from Rhodia with headquarters in Cranbury, N.J.

The above surfactants can be employed at any suitable concentration that will result in a desired viscosity. Examples of suitable concentrations can range from about 0.5 gallon per thousand ("gpt") or more, such as about 1 gpt to about 20 gpt, or about 2 gpt to about 8 gpt.

By employing one or more of the surfactants discussed above, it may be possible to reduce mixing time of the zwitterionic polymers of the present application compared to the time it would take to mix the polymers without a surfactant. In an embodiment, mixing times can be reduced sufficiently to allow for on-the-fly mixing. Examples of suitable mixing times can range from about 1 to about 2 minutes or less. Of course, longer mixing times can be employed if desired.

The short mixing times can allow the well servicing fluids of the present application to reach a desired viscosity relatively quickly, such as, for example, within the mixing time of 1 to 2 minutes or less.

Other suitable surfactants that are soluble in the brine or produced water used in the well servicing fluid can also be employed in addition to or as an alternative to those listed above, including surfactants employed during the preparation of the polymer. These other surfactants can be employed in, for example, batch mixing processes. Examples of such surfactants are the ammonium salts of polyarylphenyl ether sulfate, such as the ammonium salt of tristyrylphenol ethoxylate sulfate, which is sold under the tradename SOPROPHOR 4 D 384, by RHODIA. Surfactants other than ammonium based salts can also be employed.

In an embodiment, all or a portion of the surfactant can be introduced with the polymer, if a surfactant was used during the preparation of the polymer. In an embodiment, surfactant can be added to the composition in addition to the surfactant employed during preparation of the polymer. Alternatively, all of the surfactant can be added separately from the polymer.

The total amount of surfactant included in the composition can vary depending upon the use of the composition. For example, the amount can range from the values indicated above to about 20%, by weight, such as from about 5% to about 15% by weight of surfactant with respect to the polymer.

The amount by weight of polymer in the compositions can depend on the rheological behavior desired and/or on the thickening strength desired for the compositions and on the possible presence of other compounds, in particular ionic compounds, such as salts. In an embodiment, the amount by weight can be greater than about 0.01% by weight, with respect to the composition, for example greater than about 0.1% by weight and often greater than or equal to about 0.5% or about 1% by weight. The amount will generally be less than or equal to about 20% by weight, such as about 10% by weight. Advantageous thickenings may in some instances be observed at polymer concentrations ranging from about 0.1% to about 1% by weight, and/or from about 1% to about 2% by weight, and/or from about 2% to about 3% by weight, and/or from about 3% to about 4% by weight, and/or from about 4% to about 5% by weight.

As discussed above, the compositions of the present application can be employed as a well bore servicing fluid for oil wells and natural gas wells, including subsea wells. In an embodiment, the zwitterionic polymers and surfactants of the present disclosure are used as viscosifying agents in produced water or other brine formulations employed in well bores of oil and gas wells. Examples of such fluids include: drilling fluids, gravel packing fluids, fracturing fluids, frac packing fluids, completion fluids, and fluids used for completion pills.

Thus, the present disclosure can be directed to a method of drilling an oil or natural gas well bore in which the fluids of the present application are utilized as a drilling fluid. In an embodiment, well bore servicing fluids of the present disclosure comprising an aqueous media, such as produced water or other brines, a zwitterionic polymer and a surfactant can be circulated through a well bore as it is drilled into a subterranean formation. The drilling fluid can carry drill cuttings created by the drilling process in a return flow stream back to the well drilling platform. The circulation of the drilling fluid can be terminated after drilling is stopped. Then a string of pipe, such as, for example, an annular pipe casing, can be run into the well bore. In an optional second stage of the process, the well bore servicing fluid of the present application can then be circulated through the well bore to remove additional drill cuttings. For example, the well bore servicing fluid can be pumped downwardly through the interior of the pipe and upwardly through an annulus, which is located between the exterior of the pipe and the walls of the well bore, to thereby carry the cuttings out of the well bore.

In an embodiment, the drilling fluid used during the second stage of the process may be different than the drilling fluid used during the drilling stage. For example, the well bore servicing fluids of the present disclosure can be employed during the drilling stage, while a second drilling fluid other than the well bore servicing fluids of the present disclosure can be employed during the second stage, or vice versa.

The well bore servicing fluids of the present application can be employed as gravel packing fluids. In an embodiment, a well bore servicing fluid comprising an aqueous media, such as produced water or other brines, a zwitterionic polymer and a surfactant can further comprise gravel suspended therein. As part of the gravel packing process, a permeable screen may be placed against the face of the subterranean formation, followed by pumping the well bore servicing fluid comprising the gravel into the annulus of the well bore such that gravel becomes packed against the exterior of the screen.

The well bore servicing fluids of the present application can also be employed as fracturing fluids. In an embodiment, a well bore servicing fluid of the present disclosure comprising a zwitterionic polymer, a surfactant and an aqueous media, such as produced water or other brines, can be used to fracture a subterranean formation. The well bore servicing fluid is pumped into the well bore at a rate and a pressure sufficient to form fractures that extend into the subterranean formation, providing additional pathways through which fluids being produced can flow into the well bores. In an embodiment, the well bore servicing fluid can include a proppant. Well known propants used in fracturing include graded sand, bauxite, or resin coated sand, any of which may be suspended in the fracturing fluid. The proppant becomes deposited into the fractures and thus holds the fractures open after the pressure exerted on the fracturing fluid has been released.

The compositions of the present disclosure, whatever the use, can comprise dispersed liquid particles (emulsified droplets) or dispersed solid particles. Liquid particles can, for example, be synthetic oils (for example silicone oils) or oils of vegetable or mineral origin. The solid particles can in particular be sand, density-modifying particles, debris and/or polymeric particles. The polymer can promote the suspending of these particles during the time necessary for the use of the composition and/or during a storage time. It can also alternatively contribute to easy transportation of the particles, in order to position them at or to move them to an appropriate spot.

The fluids of the present disclosure can include additional ingredients to modify the rheological and chemical properties of the fluid. Clayey materials such as bentonite, attapulgite, sepiolite or other material commonly used in drilling fluids can be included to provide drilling muds to lubricate the drill strings and suspend drill cuttings. The fluids can also include buffering agents or pH control additives. Buffering agents can be used in well bore servicing fluids to maintain the desired pH of the fluid. If the pH of the well bore servicing fluid becomes too low, severe degradation of the included polymers, such as the viscosifying agents, may result. Examples of suitable buffering agents include, but are not limited to: sodium phosphate, sodium hydrogen phosphate, boric acid-sodium hydroxide, citric acid-sodium hydroxide, boric acid-borax, sodium bicarbonate, ammonium salts, sodium salts, potassium salts, dibasic phosphate, tribasic phosphate, lime, slaked lime, magnesium oxide, basic magnesium carbonate, calcium oxide and zinc oxide.

The temperature and the pressure of the fluid can vary according to the use which is made of the fluid and its environment. The polymer can remain effective over a relatively wide range of temperatures, including under conditions requiring relatively high temperatures, in particular in the fields of oil and/or gas extraction. For example, the composition can have a temperature ranging from about 20° C. to relatively high temperatures, such as greater than or equal to 50° C., greater than or equal to 70° C., greater than or equal to 100° C., greater than or equal to 150° C. or greater than or equal to 180° C. The pressure can be any suitable pressure, such as, for example, atmospheric pressure or a greater pressure.

A reduced specific viscosity can be measured by dissolving the polymer in a 20% by weight aqueous NaCl solution. The intrinsic viscosity η can then be obtained by linear extrapolation of the reduced specific viscosity to zero concentration of polymer. The slope of this extrapolation is equal to $k'(\eta)^2$, k' being the Huggins coefficient. This method of calculating η is described in detail in the publication Polymer Handbook (4$^{th}$ edition), J. Brandrup, E. H. Immergut and E. A. Grulke, Wiley (1999), the description of calculating η in the Polymer Handbook being hereby incorporated by reference in its entirety. The specific viscosity makes it possible to have indirect access to the molecular weights of greater than approximately 2 000 000, which cannot be directly determined experimentally. In an embodiment of the present application, the zwitterionic polymers exhibit an intrinsic viscosity of about 600 or greater, such as about 1000 or greater, where the reduced specific viscosity is measured by dissolving the polymer in a 20% by weight aqueous NaCl solution, as described above.

Other characteristics or advantages of the invention may become apparent in the light of the examples which follow, given by way of illustration without a limiting nature.

EXAMPLES

Example 1 (Comparative)

Solution Polymerization-Poly(Acrylamide/SPP) 90/10 Mol/Mol Copolymerization 82.4 g of 50% acrylamide in water, 18.8 g of SPP and 94.4 g of water are added to a 500 ml three-necked round-bottom flask equipped with a nitrogen inlet, a mechanical stirrer (anchor), a reflux condenser and temperature regulation via a thermostatically controlled bath of oil. The temperature of the reaction medium is brought to 65° C. while flushing with nitrogen. 0.3 g of sodium persulphate dissolved in 5 g of water is added at 65° C. The temperature of the reaction medium is maintained for 24 h. The combined mixture is subsequently cooled to ambient temperature. The final product exists in the form of a translucent gel.

The molar mass of the polymer obtained can be conventionally adjusted by modifying the amount of initiator introduced, the reaction temperature or the addition of a transfer agent. The concentrations of initiator and the corresponding molar masses, determined by steric exclusion chromatography (+CVG ref) are referenced in Table 1 below:

TABLE 1

| Reference | Concentration of initiator with respect to the monomers | Mw by chromatography (kg/mol) |
| --- | --- | --- |
| Example 1-1 | 0.2% + transfer agent | 63 |
| Example 1-2 | 5% | 370 |

Example 2

Inverse Emulsion Polymerization-Poly(Acrylamide/SPP) 90/10 Mol/Mol

The synthesis takes place in two stages: preparation of an emulsion comprising the monomers and the surfactants, followed by copolymerization.

Preparation of an Emulsion Comprising the Monomers and the Surfactants:

110.2 g of Shellsol D80 (Shell Chemicals), 18.5 g of G946 (ICI), 9.3 g of Rhodasurf LA-3 (Rhodia) and 4.9 g of Hypermer B261 (Uniquema) are added to a 250 ml glass beaker with magnetic stirring. Stirring is maintained until a clear solution is obtained (Mixture 1). 199.8 g of 50% acrylamide in water, 91.3 g of 50% SPP in water, 0.2 g of Versene 100 (Dow) and 2.9 g of sodium sulphate are added to a 500 ml glass beaker with magnetic stirring. Stirring is maintained until a clear solution is obtained (Mixture 2). Mixture 2 is subsequently introduced into Mixture 1 with magnetic stirring. Stirring is maintained for 5 min and then all the liquid is added to a mixer of rotor/stator type in order to be mixed for 10 s (6000 revolutions/min). The stable emulsion is thus obtained.

Copolymerization

All the emulsion prepared immediately above is added to a 1 liter jacketed glass reactor equipped with a nitrogen inlet, a mechanical stirrer, a reflux condenser and temperature regulation via a thermostatically controlled bath. The temperature of the reaction medium is brought to 45° C. while flushing with nitrogen. 0.2 g of Trigonox 25C75 (Akzo Nobel) is added at 45° C. An additional 0.2 g of Trigonox 25C75 is added 4 hours after this addition. The temperature of the reaction medium is subsequently brought to 55° C. for 3 h. The combined mixture is cooled to ambient temperature.

The final emulsion exists in the form of a translucent and slightly coloured liquid which is not very viscous.

By following the procedure described above, polymers of variable molar masses are produced by modifying the level of initiator. However, for numerous tests, the molar masses are too high to be measured by steric exclusion chromatography. The molar masses are likely significantly greater than $3 \times 10^6$ g/mol. Furthermore, copolymers with variable acrylamide/SPP ratios are also synthesized. The characteristics of the products are referenced in Table 2 below:

TABLE 2

| Reference | Operating conditions | Mw by chromatography (kg/mol) |
|---|---|---|
| Example 2-1 | Concentration initiator = 0.1 mol % vs monomers, T = 65° C. [Am]/[SPP] = 90/10 mol/mol | 2000 |
| Example 2-2 | Concentration initiator = 0.05 mol % vs monomers, T = 65° C. [Am]/[SPP] = 90/10 mol/mol | not measurable |
| Example 2-3 | Concentration initiator = 0.05mol % vs monomers, T = 55° C. [Am]/[SPP] = 90/10 mol/mol | not measurable |
| Example 2-4 | Concentration initiator = 0.1 mol % vs monomers, [Am]/[SPP] = 90/10 mol/mol | not measurable |
| Example 2-5 | Concentration initiator = 0.02 mol % vs monomers, [Am]/[SPP] = 90/10 mol/mol | not measurable |
| Example 2-6 | Concentration initiator = 0.1 mol % vs monomers, [Am]/[SPP] = 98/2 mol/mol | not measurable |
| Example 2-7 | Concentration initiator = 0.1 mol % vs monomers, [Am]/[SPP] = 95/5 mol/mol | not measurable |
| Example 2-8 | Concentration initiator = 0.1 mol % vs monomers, [Am]/[SPP] = 80/20 mol/mol | not measurable |
| Example 2-9 | Concentration initiator = 0.1 mol % vs monomers, [Am]/[SPP] = 70/30 mol/mol | not measurable |
| Example 2-10 | Concentration initiator = 0.1 mol % vs monomers, [Am]/[SPP] = 50/50 mol/mol | not measurable |

Example 3

Evaluations

The viscosities of the polymer solutions are evaluated using an AR2000 rheometer (TA Instrument, Surrey, United Kingdom) provided with geometry of Couette type (internal radius=14 mm; external radius=15 mm and height=42 mm).

Molar Masses

The viscosity contributed by the dissolution of a polymer is represented by its intrinsic viscosity (the linear extrapolation to zero concentration of the reduced specific viscosity)

$$[\eta] = \lim_{c \to 0} \frac{\eta - \eta_0}{\eta_0 c},$$

where $\eta$ is the viscosity of the solution comprising the polymer, $\eta_0$ is the viscosity of the solvent and c is the concentration of polymer.

The intrinsic viscosity, for a polymer chemical composition under given solvent conditions, is related to the molar mass by the Mark-Houwink relationship. See Polymer Handbook (4$^{th}$ edition), J. Brandrup, E.H. Immergut and E. A. Grulke, Wiley (1999), the description of the Mark-Houwink relationship in the Polymer Handbook being hereby incorporated by reference in its entirety.

$[\eta]=KM^a$, with "K" and "a" constants which depend on the chemical composition of the polymer and on the solvent and temperature.

The polymers of Examples 1 and 2 are purified and dried and then dissolved in a 20% by weight NaCl solution at different concentrations of polymer. The reduced specific viscosity curves as a function of the polymer concentration make it possible to determine the intrinsic viscosity given in Table 3 below.

TABLE 3

|  | Reference | Mw by chromatography (kg/mol) | Intrinsic viscosity (ml/g) |
|---|---|---|---|
| Solution | Example 1-1 | 63 | 37 |
| Solution | Example 1-2 | 370 | 112 |
| Inverse emulsion | Example 2-1 | 2000 | 320 |
| Inverse emulsion | Example 2-2 | not measurable | 470 |
| Inverse emulsion | Example 2-3 | not measurable | 550 |
| Inverse emulsion | Example 2-4 | not measurable | 850 |
| Inverse emulsion | Example 2-5 | not measurable | 1100 |

Rheology in Saline Solutions

The copolymers described in Examples 1 and 2 are used in the solutions of variable salinities described in Table 4 below.

TABLE 4

| Reference | Composition (w salt per 1 kg of solution) | Density | Viscosity at 25° C. (mPa · s) |
|---|---|---|---|
| ZnBr$_2$/CaBr$_2$ | ZnBr$_2$ 550 g/CaBr$_2$ 230 g | 2.3 | 25.2 |
| CaCl$_2$/CaBr$_2$ | CaCl$_2$ 230 g/CaBr$_2$ 330 g | 1.7 | 5.9 |
| 45% NaBr | NaBr 446 g | 1.5 | 2.4 |
| 20% NaCl | NaCl 200 g | 1.15 | 1.48 |
| 10% NaCl | NaCl 100 g | 1.07 | 1.2 |
| 5% NaCl | NaCl 50 g | 1.03 | 1.0 |
| Purified water | / | 0.99 | 0.95 |

The polymers are purified and dried. The powders obtained are dissolved at 10 g/l with magnetic stirring. The viscosities are measured 72 h after the preparation of the samples and the values obtained are collated in Table 5 below.

TABLE 5

Relative viscosity at a polymer concentration at 10 g/l (gradient of 1 s$^{-1}$ at 25° C).

|  | Reference | Intrinsic viscosity (ml/g) | Relative viscosity: Purified water | Relative viscosity: 5% NaCl | Relative viscosity: 10% NaCl | Relative viscosity: 20% NaCl |
|---|---|---|---|---|---|---|
| Solution | Example 1-1 | 37 | 1.3 | 1.5 | 1.3 | 1.4 |
| Solution | Example 1-2 | 112 | 2.5 | 2.3 | 2.1 | 2.4 |

TABLE 5-continued

Relative viscosity at a polymer concentration at 10 g/l
(gradient of 1 s$^{-1}$ at 25° C).

|  | Reference | Intrinsic viscosity (ml/g) | Relative viscosity: Purified water | Relative viscosity: 5% NaCl | Relative viscosity: 10% NaCl | Relative viscosity: 20% NaCl |
|---|---|---|---|---|---|---|
| Inverse emulsion | Example 2-1 | 320 | 14 | 10 | 9.2 | 11 |
| Inverse emulsion | Example 2-2 | 470 | 16 | 18 | 19 | 22 |
| Inverse emulsion | Example 2-3 | 550 | 51 | 60 | 72 | 82 |
| Inverse emulsion | Example 2-4 | 850 | 59 | 98 | 102 | 108 |
| Inverse emulsion | Example 2-5 | 1100 | 100 | 179 | 165 | 196 |

These results demonstrate that the viscosifying power of the polymers according to the invention increases as the molar mass (and the intrinsic viscosity) increases and as the salinity increases.

Direct Dispersion

The polymers of Example 2, synthesized by inverse emulsion polymerization with the composition AM/SPP (90/10), are dispersed directly in the brines.

5% by weight of surfactant Soprophor 4D384 (Rhodia) are added to the inverse emulsion 5 minutes before mixing with the brines. The amount necessary to obtain 10 g/l of polymer is dispersed in the brines. These preparations are, in a first step, stirred vigorously by hand for a few moments and then stirred with a magnetic bar until they are used.

Relative viscosities at a polymer concentration of 10 g/l are measured here 24 h after the preparation of the samples (gradient of 1 s$^{-1}$ at 25° C.) and the values are collated in Table 6 below.

TABLE 6

| Reference | Intrinsic viscosity (ml/g) | Relative viscosity: NaBr | Relative viscosity: CaCl$_2$/CaBr$_2$ | Relative viscosity: ZnBr$_2$/CaBr$_2$ |
|---|---|---|---|---|
| Example 2-1 | 320 | 17 | 25 | 115 |
| Example 2-2 | 470 | 59 | 110 | 529 |
| Example 2-3 | 550 | 77 | 217 | 549 |
| Example 2-4 | 850 | 114 | 437 | 797 |

These results demonstrate that the viscosifying power of the polymers according to the invention is very high in brines highly concentrated in salt.

High-Temperature Stability

Solutions of polymers comprising variable levels of SPP are prepared according to the protocol described in Example 2 at a concentration by weight of 0.5% in the brine ZnBr$_2$/CaBr$_2$.

The viscosities of these solutions are measured after mixing at ambient temperature and then after ageing in pressurized cells (acid digestion bombs—Parr instruments) in a rolling oven at 160° C. for 6 h.

The aged solutions may exhibit solid residues; if appropriate, these solutions are filtered through a 100 μm cloth. The viscosities are then measured at 90° C. and the values are collated in Table 7 below.

TABLE 7

Relative viscosity at a polymer concentration of 0.5% by weight
(gradient of 100 s$^{-1}$ at 90° C.).

|  | SPP level (mol %) | Relative viscosity: initial solution | Relative viscosity: solutions aged at 160° C. |  |
|---|---|---|---|---|
| Example 2-6 | 2 | 51 | 1.0 | Precipitate |
| Example 2-7 | 5 | 53 | 1.1 | Precipitate |
| Example 2-4 | 10 | 60 | 9.7 | Homogeneous solution |
| Example 2-8 | 20 | 33 | 8.8 | Homogeneous solution |
| Example 2-9 | 30 | 13.5 | 11.2 | Homogeneous solution |
| Example 2-10 | 50 | 5.5 | 4.8 | Homogeneous solution |

These results demonstrate that the high-temperature stability of the polymers according to the invention dissolved in brines is directly related to the level of SPP incorporated in the polymer. In this instance, a minimum level of 10 mol % is necessary to maintain the homogeneity of the solution if the latter is exposed for a long time to high temperatures.

Example 4

Optimization of Polymer-Surfactant Ratio

A surfactant, SOPROPHOR 4 D 384, made by Rhodia, was first dissolved into the polymer of Example 2-5 (polymer concentration of 30 wt. %), above, at varying concentrations—2% to 5% by total volume. Next, 40 gpt of each blend was tested in HyCal II (14.2 ppg CaBr$_2$), NoCal II (11.0-12.5 ppg NaBr), and HyCal III (19.2 ppg ZnBr$_2$). The polymer/surfactant blend was added to the different brines and allowed to hydrate for 15 minutes at a constant shear rate of approximately 700 RPM using a standard servodyne mixer. After that, the samples were tested at 200° F. using a Chandler 5550 viscometer. From the data obtained, it was determined that the 5% surfactant concentration was optimum. The optimum concentration was also confirmed to be 5% surfactant concentration after testing with 50 gpt of polymer loading with 4 and 5% surfactant concentraion. See FIGS. 1-3.

Example 5

The 5% polymer/surfactant blend of Example 4 was then tested at various temperatures (150° F.-350° F.) at loadings of 40 gpt to 50 gpt with all three brines (HyCal II (14.2 ppg CaBr$_2$), NoCal II (11.0-12.5 ppg NaBr), and HyCal III (19.2 ppg ZnBr$_2$)). The polymer blend was added to the various brines and allowed to hydrate for 15 minutes. The samples were then tested at the different temperatures using a Chandler 5550 Viscometer. The resulting data for HyCal II, NoCal II and HyCal III is respectively shown in FIGS. 4, 5 and 6. From the data it was determined that the brine viscosifier is stable up to about 350° F. for 1 hour. All other temperatures showed stability for 3 hours. The data shows that good viscosities were achieved at the various temperatures for all three brines.

Example 6

Produced Water Analysis

Produced water samples from the Bakken formation and Marcellus formation were analyzed using API Recommended practice 45 available from American Petroleum Institute. Results are shown in Table 8, below.

TABLE 8

| Conc. In mg/L | Bakken Water | Marcellus Water |
| --- | --- | --- |
| Calcium (Ca) | 18,370 | 27,900 |
| Barium (Ba) | 11 | 9,800 |
| Magnesium (Mg) | 1,242 | 1,470 |
| Iron (Fe) | 95 | 79 |
| Potassium (K) | 5,397 | 341 |
| Sodium (Na) | 88,690 | 69,600 |
| Boron (B) | 334 | 3 |
| Copper (Cu) | ND | ND |
| Manganese (Mn) | 6 | 11 |
| Molybdenum (Mo) | ND | ND |
| Phosphorus (P) | ND | ND |
| Silica (Si) | 3 | 5 |
| Strontium (Sr) | 1,213 | 6,970 |
| Zinc (Zn) | 3 | ND |
| Aluminum (Al) | ND | ND |
| Chloride | 163,500 | 165,500 |
| Sulfate | 282 | 0 |
| Carbonate | NA | NA |
| Bicarbonate | 127 | 10 |
| TDS | 268,242 | 273,828 |
| pH | 5.43 | 4.45 |
| Specific Gravity | 1.1855 | 1.1922 |
| Total Hardness | 50988 | 75726 |

The above water analysis indicates very high amounts of dissolved solids and total hardness for the Bakken and Marcellus produced water samples. The water was filtered through a Whatman no. 42 filter paper. The filtered Bakken and Marcellus water was used in the Examples below.

Example 7

Figure 1:
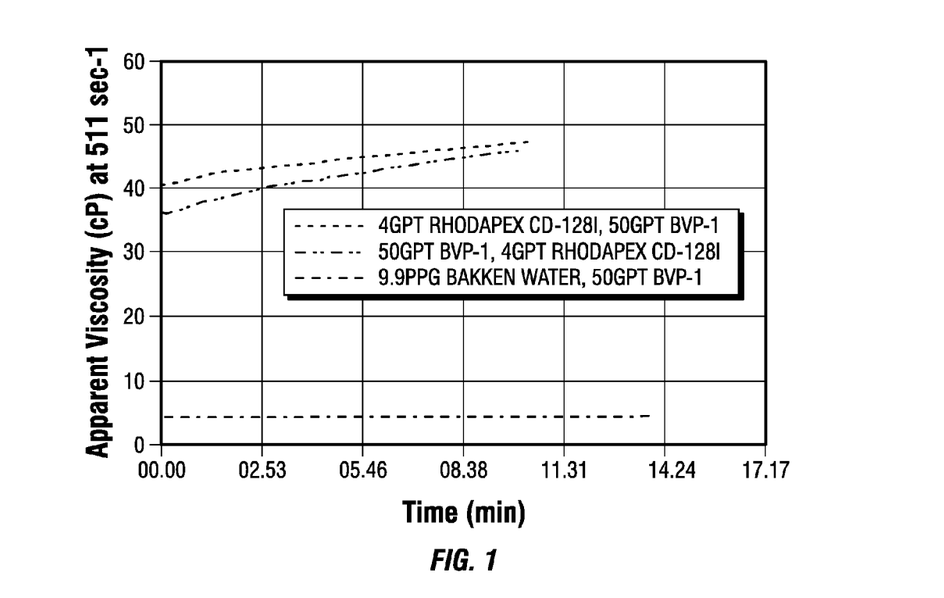
FIGS. 1 to 9 illustrate viscosity data for various mixtures, according to embodiments of the present disclosure.
Figure 2:
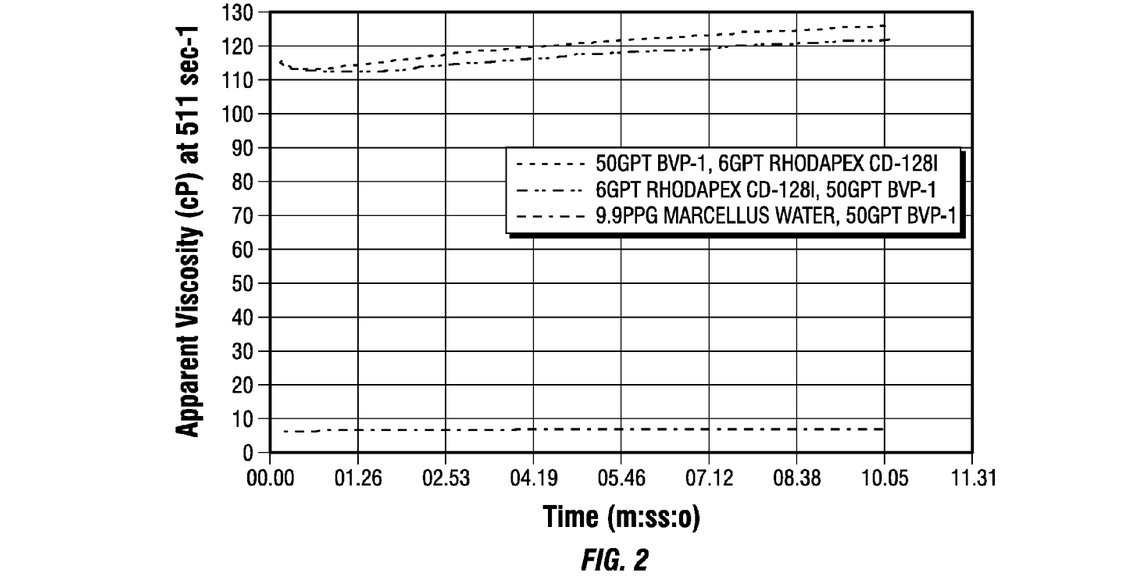

Apparent viscosity testing was performed at room temperature using an OFITE M900 Viscometer for both Bakken and Marcellus water. The order of adding the Rhodapex CD-128I and BVP-1 ingredients during mixing was tested for effect on apparent viscosity. The results are shown in FIGS. 1 and 2. The testing for FIG. 1 included the following compositions, with ingredients listed in order of mixing:

| | |
| --- | --- |
| 7A. | 9.9 ppg Bakken Water |
| | 4 gpt Rhodapex CD-128I |
| | 50 gpt BVP-1 |
| 7B. | 9.9 ppg Bakken Water |
| | 50 gpt BVP-1 |
| | 4 gpt Rhodapex CD-128I |
| 7C. | 9.9 ppg Bakken Water |
| | 50 gpt BVP-1 |

The testing for FIG. 2 included the following compositions, with ingredients listed in order of mixing:

| | |
| --- | --- |
| 7D. | 9.9 ppg Marcellus Water |
| | 6 gpt Rhodapex CD-128I |
| | 50 gpt BVP-1 |
| 7E. | 9.9 ppg Marcellus Water |
| | 50 gpt BVP-1 |
| | 6 gpt Rhodapex CD-128I |
| 7F. | 9.9 ppg Marcellus Water |
| | 50 gpt BVP-1 |

Results showed that using the Rhodapex CD-1281 and BVP-1 combined provided a significant increase in apparent viscosity at room temperature when compared with using the BVP-1 alone. The results also showed that when using either the Bakken or Marcellus water, adding the BVP-1 before adding the Rhodapex CD-1281 provided a marginal increase in apparent viscosity when compared with the same composition in which the Rhodapex CD1281 was added before the BVP-1.

Examples 8 and 9

All of the fluids in the examples below were prepared by the following procedure: 250 ml of produced water was added to a 16 oz jar. The jar was placed under an overhead stirrer at 1000 rpm. Once a vortex was established, the concentration of brine viscosifier BVP-1 was added. Then the surfactant Rhodapex CD-128I was added. Finally, a breaker was added if necessary. The resulting composition was mixed for 1 minute and then removed from the overhead stirrer for testing. Testing was performed using an OFITE M900 viscometer for room temperature measurements. A Chandler 5550 HPHT viscometer was used for high temperature measurements.

Example 8

Fluid in Bakken Produced Water at High Temperatures

The following example well servicing fluid compositions were prepared using Bakken Produced Water.

| | |
| --- | --- |
| 8A. | Bakken Produced Water |
| | 60 gpt BVP-1 |
| | 6 gpt Rhodapex CD-128I |
| 8B. | Bakken Produced Water |
| | 50 gpt BVP-1 |
| | 8 gpt Rhodapex CD-128I |
| 8C. | Bakken Produced Water |
| | 40 gpt BVP-1 |
| | 8 gpt Rhodapex CD-128I |

The compositions of Examples 8A, 8B and 8C were heated to 200° F. and 250° F. As shown in the figures, various amounts of oxidizing breaker GBB-1, available from BJ Services Company, were also added to these compositions. Apparent viscosity data was then measured using a Chandler 5550 Viscometer at a shear rate of 100 sec$^{-1}$.

Figure 3:
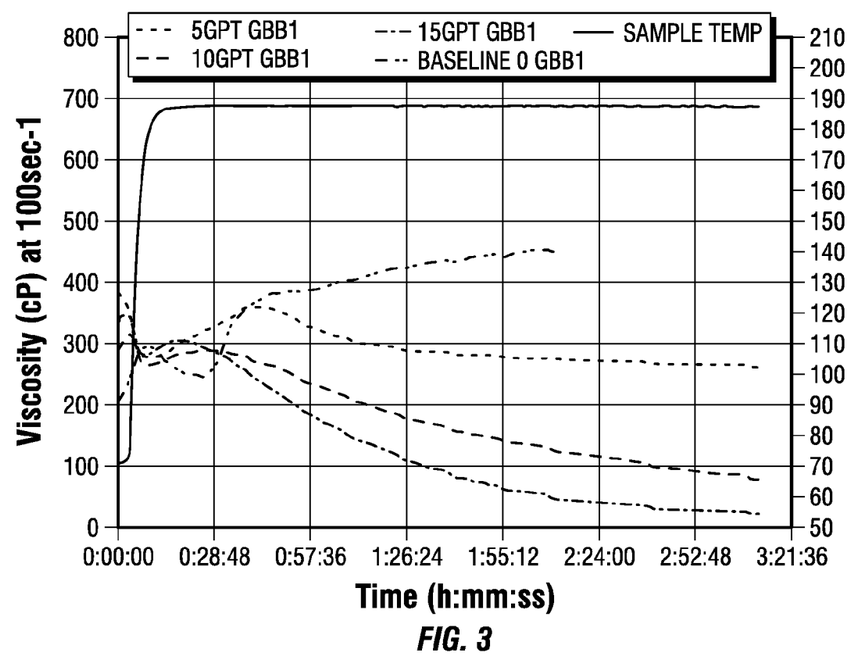
Figure 4:
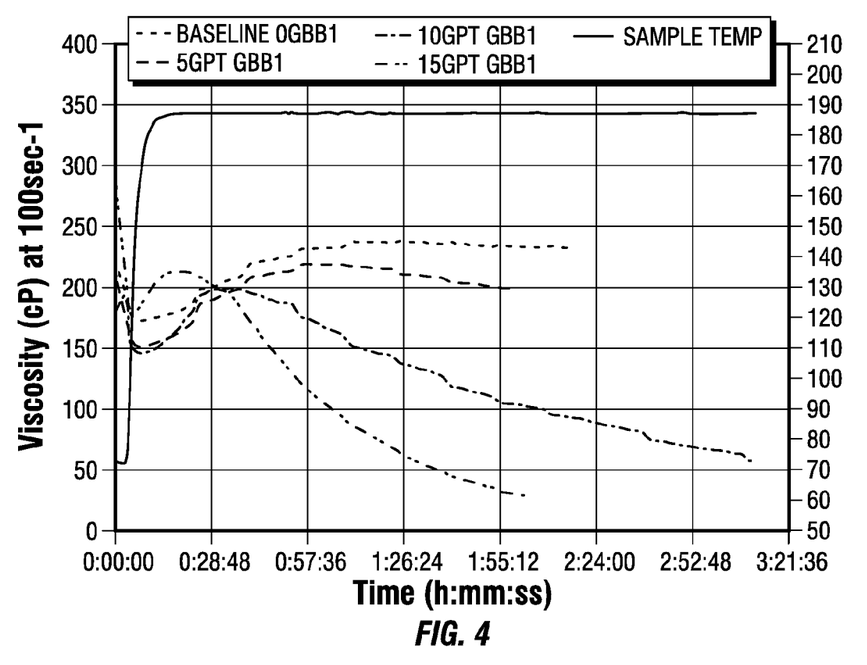
Figure 5:
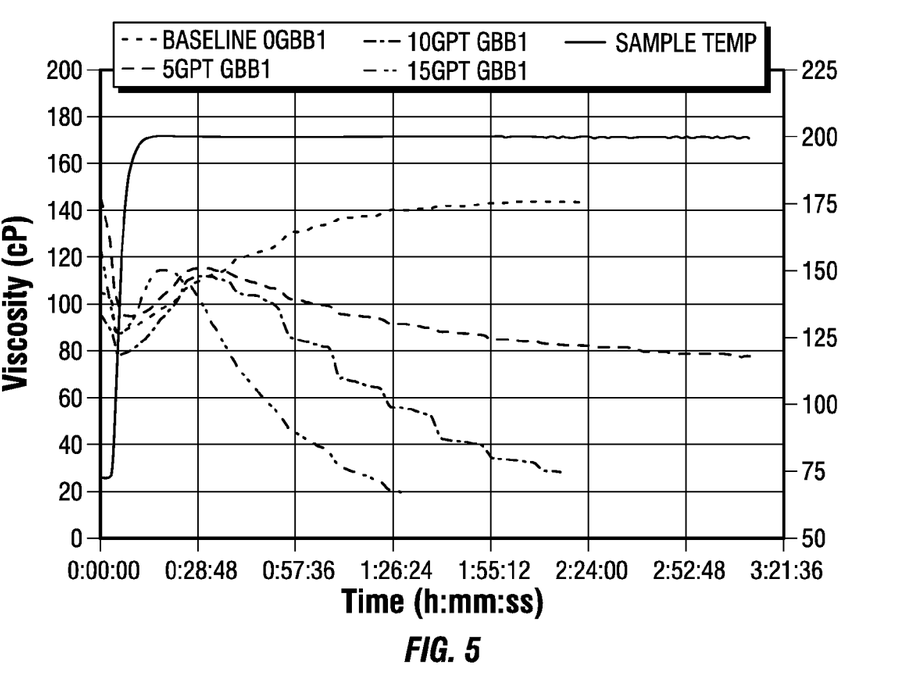
Figure 6:
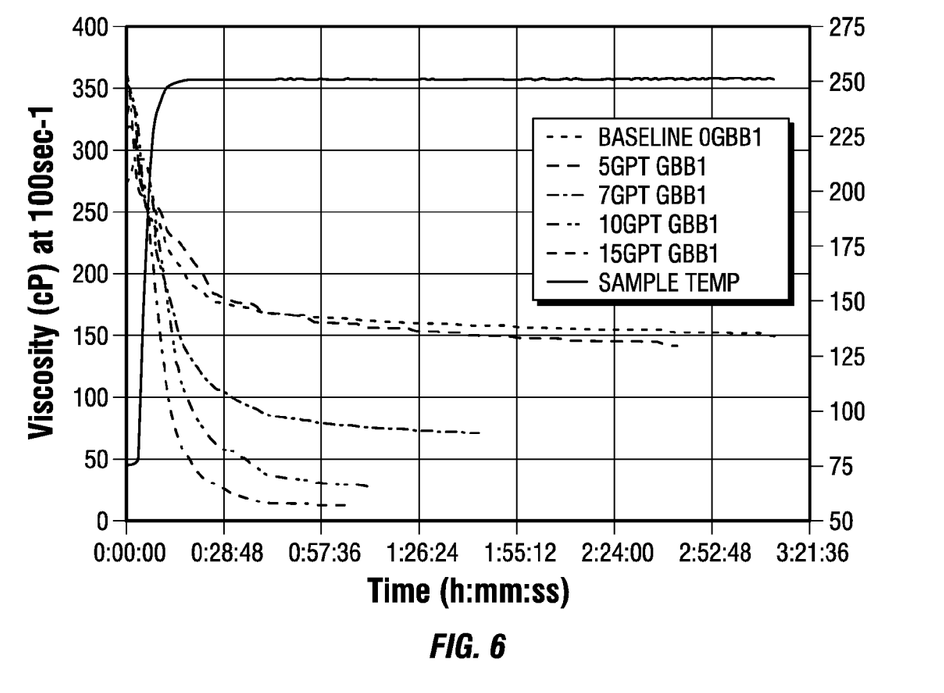
Figure 7:
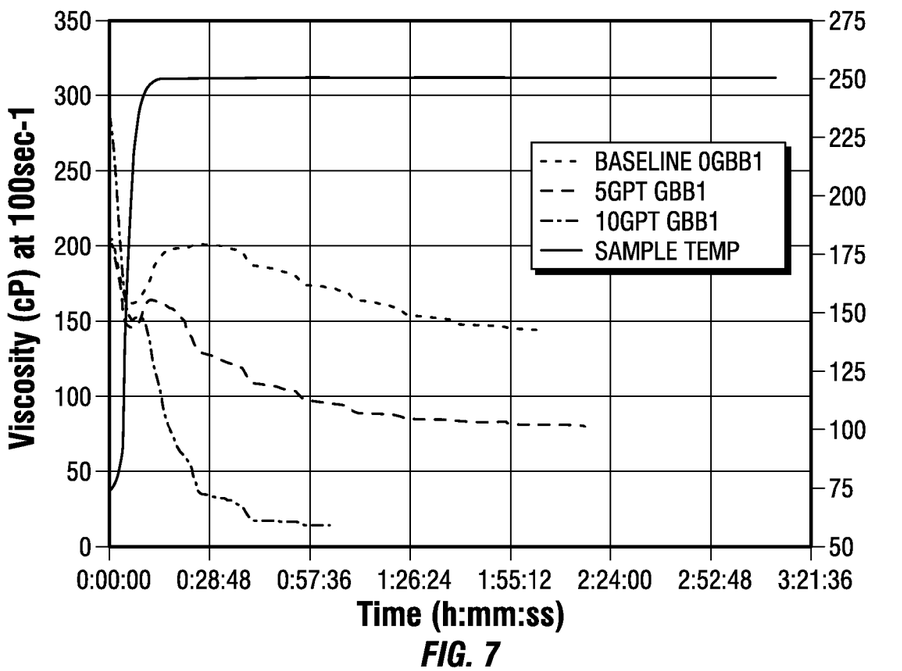
Figure 8:
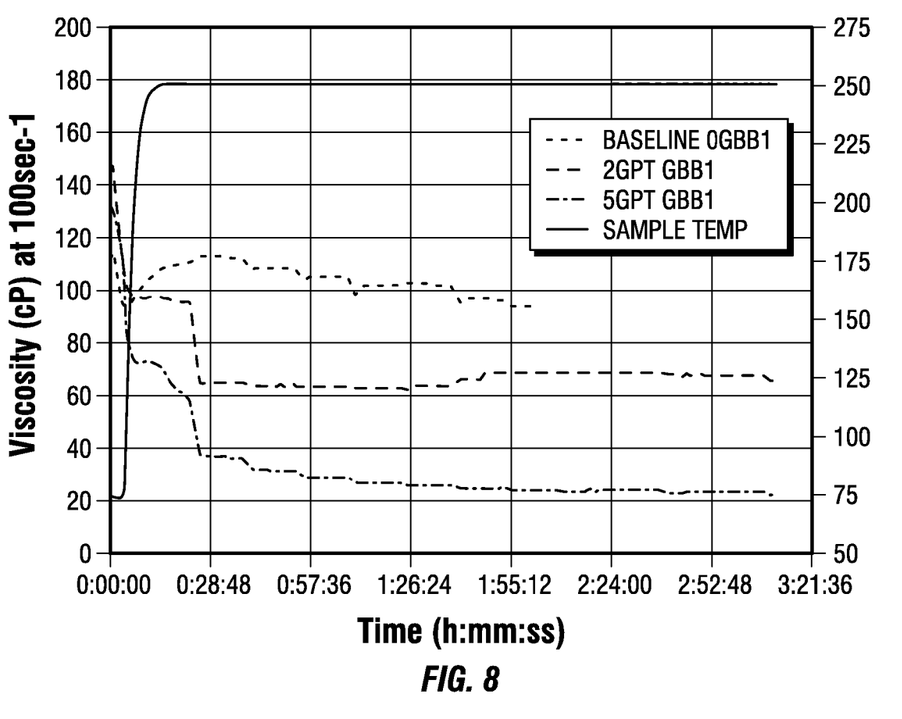

Results at 200° F. for compositions 8A to 8C are respectively shown in FIGS. 3-5. Results at 250° F. for compositions 8A to 8C are respectively shown in FIGS. 6-8. The results indicate that the viscosity at temperature can be controlled by varying the amounts of BVP-1 and Rhodapex CD-128I. In addition, the viscosity can be broken (reduced) in a controlled fashion by varying the amount of breaker added to the compositions.

Example 9

Fluid in Marcellus Produced Water at High Temperatures

The following example well servicing fluid compositions were prepared using Marcellus Produced Water.

9. Marcelus Produced Water
   50 gpt BVP-1
   6 gpt Rhodapex CD-128I

Figure 9:
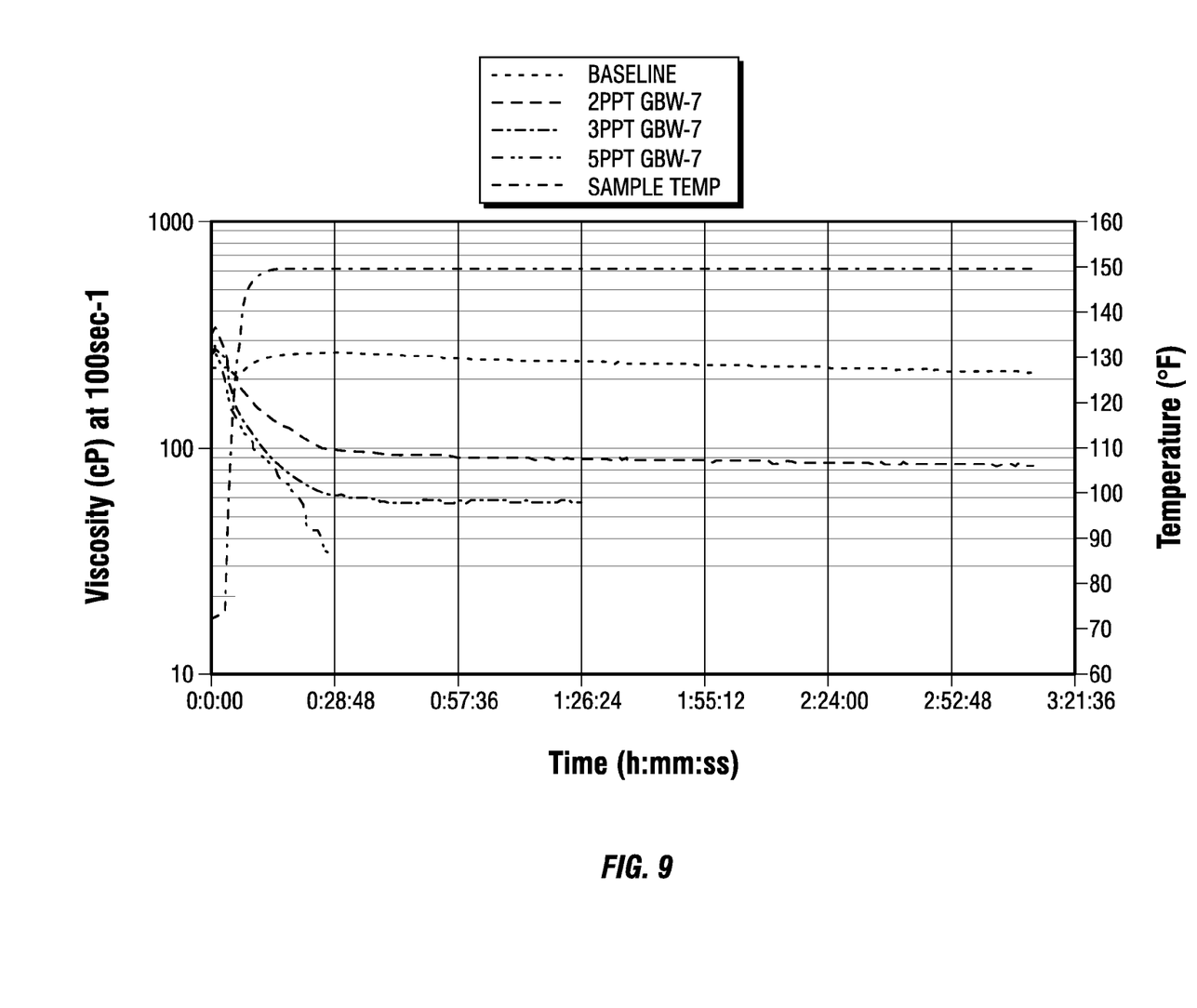

As shown in FIG. 9, various amounts of oxidizing breaker GBW-7, available from BJ Services Company, were added to these compositions. The fluid of these compositions was heated to 150° F. Apparent viscosity data was then measured using a Chandler 5550 Viscometer at a shear rate of 100 sec$^{-1}$. Results are shown in FIG. 10. The results indicate that the fluid has good viscosity at temperature. In addition, the viscosity can be broken (reduced) in a controlled fashion by varying the amount of breaker added to fluid.

Although various embodiments have been shown and described, the present disclosure is not so limited and will be understood to include all such modifications and variations as would be apparent to one skilled in the art.

What is claimed is:

1. A method comprising:
   mixing (i) a zwitterionic polymer prepared by inverse emulsion polymerization of at least one monomer $A_b$ comprising a betaine group and optionally one or more nonionic monomers $B_a$, (ii) a surfactant and (iii) produced water to form a well servicing fluid; and
   introducing the well servicing fluid into a hydrocarbon well.

2. The method of claim 1, wherein the at least one monomer $A_b$ is a substituted or unsubstituted compound chosen from the group consisting of alkylphosphonates of dialkylammonioalkyl acrylates, alkylphosphonates of dialkylammonioalkyl methacrylates, alkylphosphonates of dialkylammonioalkyl acrylamides, alkylphosphonates of dialkylammonioalkyl methacrylamides, alkylsulphonates of dialkylammonioalkyl acrylates, alkylsulphonates of dialkylammonioalkyl methacrylates, alkylsulphonates of dialkylammonioalkyl acrylamides, alkylsulphonates of dialkylammonioalkyl methacrylamides, alkylphosphonates of dialkylammonioalkoxyalkyl acrylates, alkylphosphonates of dialkylammonioalkoxyalkyl methacrylates, alkylphosphonates of dialkylammonioalkoxyalkyl acrylamides, alkylphosphonates of dialkylammonioalkoxyalkyl methacrylamides, alkylsulphonates of dialkylammonioalkoxyalkyl acrylates, alkylsulphonates of dialkylammonioalkoxyalkyl methacrylates, alkylsulphonates of dialkylammonioalkoxyalkyl acrylamides, alkylsulphonates of dialkylammonioalkoxyalkyl methacrylamides, heterocyclic betaine monomers, alkylphosphonates of dialkylammonioalkylallylics, alkylsulphonates of dialkylammonioalkylallylics, alkylphosphonates of dialkylammonioalkylstyrenes, alkylsulphonates of dialkylammonioalkylstyrenes, betaines resulting from ethylenically unsaturated anhydrides and dienes.

3. The method of claim 2, wherein the at least one monomer $A_b$ is a heterocyclic betaine chosen from the group consisting of sulphobetaines derived from piperazine, sulphobetaines derived from vinyl substituted pyridines, and sulphobetaines derived from imidazoles.

4. The method of claim 1, wherein the zwitterionic polymer is prepared by inverse emulsion polymerization of the at least one monomer $A_b$ and the one or more nonionic monomers $B_a$, wherein the one or more nonionic monomers $B_a$ is chosen from the group consisting of hydroxyethyl acrylate, hydroxyethyl methacrylate, hydroxypropyl acrylate, hydroxypropyl methacrylate, glycerol monomethacrylate, acrylamide, methacrylamide, N-methylolacrylamide, dimethylacrylamide, dimethylmethacrylamide, polyethylene oxide, polypropylene oxide, polyethylene/polypropylene oxide copolymers, α-methacrylates, vinyl alcohol and vinylpyrrolidone.

5. The method of claim 4, wherein the at least one monomer $A_b$ is chosen from the group consisting of sulphopropyldimethylammonioethyl methacrylate and sulphopropyldimethylammoniopropylmethacrylamide and the one or more nonionic monomers $B_a$ is acrylamide.

6. The method of claim 1, wherein the inverse emulsion polymerization comprises:
   preparing an inverse emulsion comprising the at least one monomer $A_b$ and the one or more nonionic monomers $B_a$ in an aqueous phase dispersed in the form of droplets in a hydrophobic external phase of an inverse emulsion; and
   after preparing the inverse emulsion, forming the zwitterionic polymer by polymerization of the at least one monomer $A_b$ and the one or more nonionic monomers $B_a$.

7. The method of claim 6, wherein preparing the inverse emulsion comprises mixing at least one emulsifying agent, the at least one monomer $A_b$, the one or more nonionic monomers $B_a$, the aqueous phase and the hydrophobic external phase.

8. The method of claim 1, wherein the polymer is in the form of an aqueous composition comprising the inverse emulsion with an aqueous phase comprising the polymer dispersed in the form of droplets in a hydrophobic external phase and other ingredients chosen from the group consisting of a surfactant, an organic salt, an inorganic salt, a detergent and a thickener.

9. The method of claim 8, wherein the aqueous composition is a saline composition comprising at least 25 g/l of a salt.

10. The method of claim 1, wherein the surfactant is an ammonium organosulfate.

11. The method of claim 1, wherein the surfactant is chosen from the group consisting of ammonium $C_4$-$C_{12}$ alkyl ether sulfates, ammonium $C_4$-$C_{12}$ alkyl ether sulfonates and ammonium $C_4$-$C_{12}$ alkyl ether phosphates.

12. The method of claim 1, wherein the surfactant is an ammonium $C_4$-$C_{12}$ alkyl ether sulfate.

13. The method of claim 1, wherein the produced water comprises a total dissolved solids content of at least 50,000 mg/L.

14. The method of claim 1, wherein the produced water comprises a total dissolved solids content ranging from about 100,000 mg/L to about 300,000 mg/L.

15. The method of claim 1, further comprising mixing the fluid comprising the zwitterionic polymer and surfactant for about 2 minutes or less prior to introducing the fluid into the hydrocarbon well.

16. The method of claim 1, further comprising obtaining the produced water from a hydrocarbon well formation prior to the mixing.

17. The method of claim 1, wherein the zwitterionic polymer exhibits an intrinsic viscosity of about 600 or greater, a reduced specific viscosity being measured by dissolving the polymer in a 20% by weight aqueous NaCl solution.

18. The method of claim 1, wherein the at least one monomer $A_b$ is chosen from the group consisting of sulphobetaines and phosphobetaines.

19. The method of claim 1, wherein the at least one monomer $A_b$ is chosen from the group consisting of compounds of formulae 10, 11, 12, 13, 18, 19, 20, 21, 22 and 23:

20. The method of claim 1, wherein the at least one monomer $A_b$ is chosen from the group consisting of substituted or unsubstituted compounds of formula 24 and 25:

(24)

(25)

in which:
R¹ is hydrogen or methyl,
R² and R³, which are identical or different, are hydrogen or alkyls having from 1 to 6 carbon atoms,
$Y_1$ is —O— or $NR_2$,
$Z^-$ is $SO_3^-$,
m is 2 or 3, and
n is 1-6.

21. The method of claim 1, wherein the at least one monomer $A_b$ is chosen from the group consisting of: sulphopropyldimethylammonioethyl methacrylate, sulphoethyldimethylammonioethyl methacrylate, sulphobutyldimethylammonioethyl methacrylate, sulphohydroxypropyldimethylammonioethyl methacrylate, sulphopropyldimethylammoniopropylacrylamide, sulphopropyldimethylammoniopropylmethacrylamide, sulphohydroxypropyldimethylammoniopropylmethacrylamide, sulphopropyldiethylammonioethoxyethyl methacrylate, 2-vinyl-1-(3-sulphopropyl)pyridinium betaine, 4-vinyl-1-(3-sulphopropyl)pyridinium betaine, sulphopropyldimethylammonioethyl acrylate, 1-vinyl-3-(3-sulphopropyl)imidazolium betaine and sulphopropylmethyldiallylammonium betaine.

22. The method of claim 1, wherein the at least one monomer $A_b$ is chosen from the group consisting of compounds of formula 1, 4, 6, 7 and 8:

23. The method of claim 1, wherein during the polymerization, the monomer $B_a$ is a hydrophilic monomer.

24. The method of claim 1, wherein the fluid is employed to fracture the well.

25. The method of claim 1, wherein the fluid is employed simultaneously with drilling of the well.

26. The method of claim 1, wherein the fluid further comprises gravel, the fluid causing the gravel to be packed in the well.

27. A method comprising:
introducing into a hydrocarbon well a fluid comprising (i) a zwitterionic polymer prepared by inverse emulsion polymerization of at least one monomer $A_b$ comprising a betaine group and optionally one or more nonionic monomers $B_a$, (ii) a surfactant chosen from the group consisting of ammonium $C_4$-$C_{12}$ alkyl ether sulfates, ammonium $C_4$-$C_{12}$ alkyl ether sulfonates and ammonium $C_4$-$C_{12}$ alkyl ether phosphates; and (iii) an aqueous based saline solution.

28. The method of claim 27, wherein the surfactant is an ammonium $C_4$-$C_{12}$ alkyl ether sulfate.

29. The method of claim 27, wherein the aqueous based saline solution is produced water.

30. The method of claim 27, wherein the aqueous based saline solution comprises a total dissolved solids content of at least 50,000 mg/L.

31. The method of claim 27, wherein the aqueous based saline solution comprises a total dissolved solids content ranging from about 100,000 mg/L to about 300,000 mg/L.

32. The method of claim 27, further comprising mixing the fluid comprising the zwitterionic polymer and surfactant for about 2 minutes or less prior to introducing the fluid into the hydrocarbon well.

\* \* \* \* \*